United States Patent
Yoo

(10) Patent No.: US 8,826,414 B2
(45) Date of Patent: *Sep. 2, 2014

(54) SYSTEM-ON-CHIP MALICIOUS CODE DETECTION APPARATUS AND APPLICATION-SPECIFIC INTEGRATED CIRCUIT FOR A MOBILE DEVICE

(75) Inventor: In Seon Yoo, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 291 days.

This patent is subject to a terminal disclaimer.

(21) Appl. No.: 13/263,915

(22) PCT Filed: Mar. 26, 2010

(86) PCT No.: PCT/KR2010/001850
§ 371 (c)(1),
(2), (4) Date: Oct. 11, 2011

(87) PCT Pub. No.: WO2010/117152
PCT Pub. Date: Oct. 14, 2010

(65) Prior Publication Data
US 2012/0042375 A1   Feb. 16, 2012

(30) Foreign Application Priority Data
Apr. 9, 2009   (KR) .................. 10-2009-0030668

(51) Int. Cl.
G06F 15/16   (2006.01)
(52) U.S. Cl.
USPC .................. 726/13; 726/11; 726/22; 713/188
(58) Field of Classification Search
USPC ............. 726/11, 13, 22, 30, 36; 713/188, 189
See application file for complete search history.

(56) References Cited

U.S. PATENT DOCUMENTS 7,418,253 B2 *   8/2008   Kavanagh .................. 455/410
7,490,350 B1 *   2/2009   Murotake et al. ............... 726/11
(Continued)

FOREIGN PATENT DOCUMENTS

JP   2009-37598 A   2/2009
KR   2001-0105116 A   11/2001
(Continued)

OTHER PUBLICATIONS

Communication dated Dec. 18, 2010 from the Korean Intellectual Property Office in counterpart Korean application No. 10-2009-0030668.
(Continued)

Primary Examiner — Amare F Tabor
(74) Attorney, Agent, or Firm — Sughrue Mion, PLLC

(57) ABSTRACT

System-on-chip (SoC) and application-specific integrated circuit (ASIC)-based apparatus for detecting malicious code in portable terminal is provided. Apparatus includes SoC including hardware-based firewall packet-filtering packet received from outside through media access control unit according to setting of firewall setting unit in SoC memory and storing filtered packet in application memory or transferring filtered packet to anti-malware engine, hardware-based anti-malware engine detecting malicious code by performing pattern-matching operation between code pattern in file transferred from firewall or file received through input/output (I/O) interface unit and pattern of malicious code registered in malware signature database (DB) of mobile device application unit, SoC memory providing setting of firewall and support file decoding function for file format recognition of anti-malware engine, and hardware-based controller controlling switching operation to transfer file filtered by firewall directly to application memory or to anti-malware engine and control malicious code detection cycle of anti-malware engine.

8 Claims, 2 Drawing Sheets

(56) References Cited

U.S. PATENT DOCUMENTS

| | | | |
|---|---|---|---|
| 7,840,763 B2* | 11/2010 | Murotake et al. | 711/153 |
| 8,122,494 B2* | 2/2012 | Kim et al. | 726/13 |
| 8,402,528 B1* | 3/2013 | Mccorkendale et al. | 726/11 |
| 8,402,540 B2* | 3/2013 | Kapoor et al. | 726/23 |
| 2004/0059943 A1* | 3/2004 | Marquet et al. | 713/201 |
| 2008/0162390 A1* | 7/2008 | Kapoor et al. | 706/20 |
| 2008/0163356 A1* | 7/2008 | Won-Jip et al. | 726/13 |
| 2009/0249465 A1* | 10/2009 | Touboul | 726/11 |
| 2009/0293126 A1* | 11/2009 | Archer et al. | 726/24 |
| 2010/0064341 A1* | 3/2010 | Aldera | 726/1 |

FOREIGN PATENT DOCUMENTS

| | | |
|---|---|---|
| KR | 2003-0030044 A | 4/2003 |
| KR | 10-2004-0090373 A | 10/2004 |
| KR | 10-2008-0056548 A | 6/2008 |
| KR | 10-2008-0074271 A | 8/2008 |
| KR | 10-2008-0113087 A | 12/2008 |
| WO | 2007/110094 A1 | 10/2007 |

OTHER PUBLICATIONS

International Search Report dated Mar. 26, 2010 in counterpart international application No. PCT/KR2010/001850.

Lockwood et al. "An Extensible, System-On-Programmable-Chip, Content-Aware Internet Firewall." FPLA Proceeding LNCS, vol. 2778/2003, pp. 859-868, Sep. 30, 2003.

* cited by examiner

SYSTEM-ON-CHIP MALICIOUS CODE DETECTION APPARATUS AND APPLICATION-SPECIFIC INTEGRATED CIRCUIT FOR A MOBILE DEVICE

CROSS-REFERENCE TO RELATED APPLICATION

This application claims priority to and the benefit of Korean Patent Application No. 10-2009-0030668, filed on Apr. 9, 2009, the disclosure of which is incorporated herein by reference in its entirety.

BACKGROUND

1. Field

A firewall and an anti-malware engine are constructed using ASIC-based hardware on a system-on-chip (SoC) in consideration of resources and performance improvement of the portable terminal to detect malicious code introduced into the portable terminal.

2. Description of the Related Art

As their widespread proliferation continues, portable terminals such as smartphones, personal digital assistants (PDAs), wireless broadband (WiBro) terminals, etc. are becoming necessities of modern life. Countless people use portable terminals (mobile devices) to communicate with one another, to exchange information, and also to exchange important business information through voice and data communication.

However, as the hardware functions of portable terminals expand and improve, application programs executed in the portable terminals become more diverse and complicated. This increases the likelihood of existing malicious codes that have attacked computers causing serious damage to portable terminals also. In particular, the widespread proliferation of wireless portable Internet services such as WiBro has led to the advent of mobile malicious code (mobile malware) that attacks vulnerabilities in application programs and services for portable terminals such as Bluetooth, multimedia messaging system (MMS), etc., in addition to malicious code that attacks vulnerabilities in existing computer application programs.

Examples of the mobile malicious code include the Timofonica worm, whose name is a modification of Telefonica, I-mode malicious code, and viruses (Phage, Vapor, and Liberty) operating in a short message service (SMS) and Palm operating system (OS).

Various types of malicious code may cause portable terminals to malfunction and may also cause serious problems such as deletion of data and leakage of personal information. Thus, countermeasures are required to effectively protect portable terminals from various malicious codes.

Anti-malware solutions applied to existing portable terminals are based on software, and the way in which they operate is as follows. A software-based vaccine program basically involves an anti-malware engine and a signature matching unit, and has a structure in which a virus signature database (DB) is periodically updated.

When scanning files in such a structure, anti-virus software searches for files that match signatures in the database to check whether or not the files are infected with a virus or to detect abnormal files. Also, firewalls applied to existing portable terminals block all network access attempts from the outside or network connection with a specific external program according to whether or not a policy has been established.

In this way, the anti-malware solutions applied to existing portable terminals are constructed on the basis of software and used in mobile devices without modification. However, mobile devices have relatively many limitations with respect to resources such as a central processing unit (CPU) and a battery. Thus, when the existing model is used as is, performance deterioration makes it inconvenient for a user to perform any operation other than malicious code detection. Furthermore, when using a software-based virus vaccine solution for existing portable terminals, performance deterioration makes it difficult to monitor all packets received via a network.

SUMMARY OF THE INVENTION

The present invention is directed to providing an apparatus for detecting malicious code introduced into a portable terminal by configuring a firewall and anti-malware using application-specific integrated circuit (ASIC)-based hardware on a system-on-chip (SoC) and changing a virus signature database (DB) to reflect locally, in order to fundamentally solve performance deterioration of a software-based virus vaccine solution and overcome the limitations of a narrow malware signature (malicious code signature) DB based on a software scheme.

According to an aspect of the present invention, there is provided an SoC and ASIC-based apparatus for detecting malicious code in a portable terminal, including an SoC. The SoC includes: a hardware-based firewall configured to perform a packet-filtering operation on a packet received from the outside through a media access control (MAC) unit according to a setting of a firewall setting unit in an SoC memory, and then store the filtered packet in an application memory or transfer the filtered packet to an anti-malware engine; the hardware-based anti-malware engine configured to detect malicious code by performing a pattern-matching operation between a code pattern in a file transferred from the firewall or a file received through an input/output (I/O) interface unit and a pattern of malicious code registered in a malware signature DB of a mobile device application unit; the SoC memory configured to provide the setting of the firewall and support a file-decoding function for file format recognition of the anti-malware engine; and a hardware-based controller configured to control a switching operation to transfer the file filtered by the firewall directly to the application memory or to the anti-malware engine, and control a malicious code detection cycle of the anti-malware engine.

The mobile device application unit interoperating with the SoC may be constructed on the application memory to update a vaccine version, and select a connection method according to a network used by a server.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DESCRIPTION OF MAJOR SYMBOLS IN THE ABOVE FIGURES

| 10: | MAC unit | 20: | I/O interface unit |
|---|---|---|---|
| 30: | SoC | 31: | Firewall |
| 31A: | Receiving unit | 31B: | Packet identification unit |
| 31C: | Packet filtering unit | 31D: | Transmitting unit |
| 32: | Anti-malware engine | 33: | SoC memory |
| 33A: | Firewall setting unit | 33B: | Decoding module |
| 33C: | Anti-malware module unit | 34: | Controller |
| 40: | Application memory | 40A: | Mobile device application unit |
| 41: | Application module | 41A: | Version sync module |
| 41B: | Update module | 41C: | Center connection module |
| 42: | DB Information unit | 42A: | Center URL information unit |
| 42B: | Device Information unit | 42C: | Malware signature DB |
| 50: | OTA module | | |

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
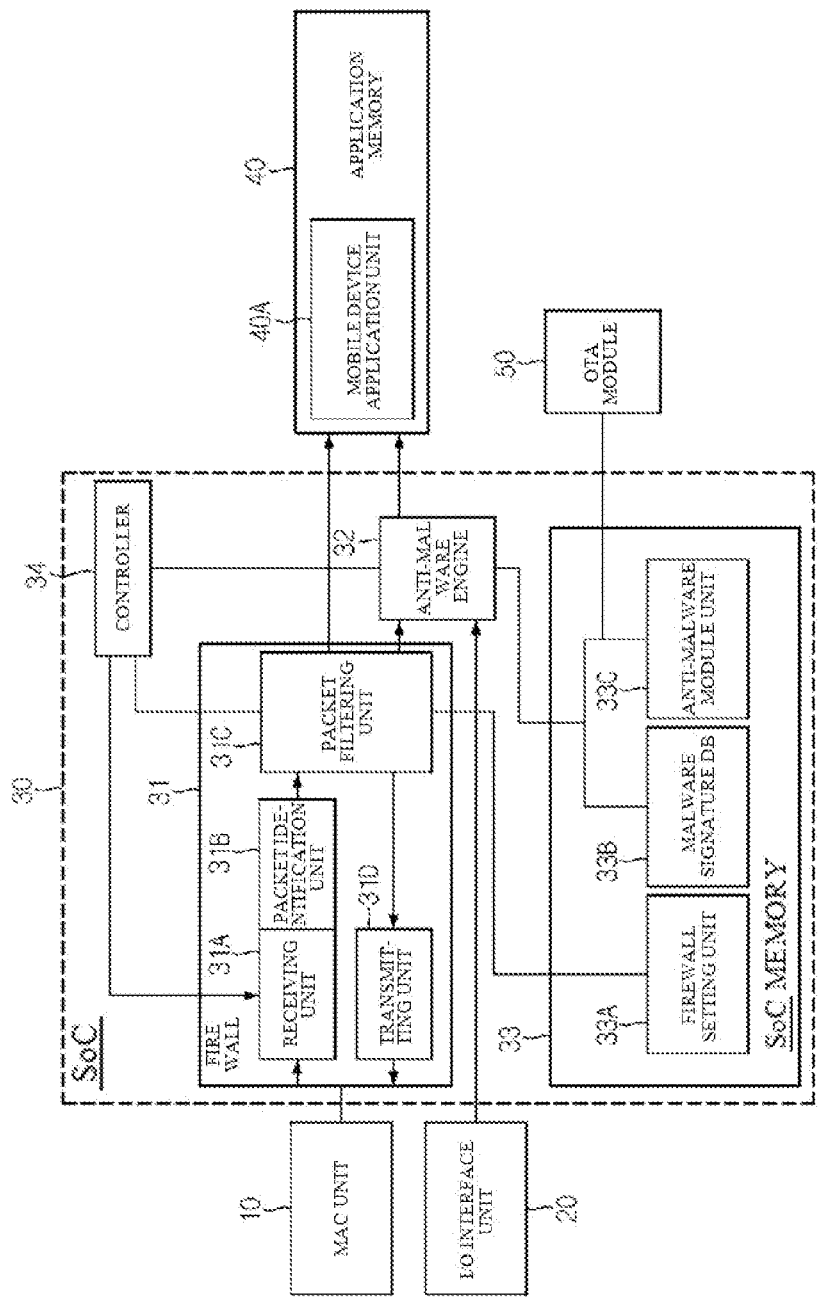
FIG. 1 is a block diagram of a system-on-chip (SoC)- and application-specific integrated circuit (ASIC)-based apparatus for detecting malicious code in a portable terminal according to an exemplary embodiment of the present invention.

FIG. 1 is a block diagram of a system-on-chip (SoC)- and application-specific integrated circuit (ASIC)-based apparatus for detecting malicious code in a portable terminal according to an exemplary embodiment of the present invention, which includes a media access control (MAC) unit 10, an input/output (I/O) interface unit 20, an SoC 30, an application memory 40, and an over-the-air (OTA) module 50 as shown in the drawing.

The SoC 30 includes a firewall 31, an anti-malware engine 32, an SoC memory 33, and a controller 34, which are implemented as ASIC-based hardware.

The firewall 31 includes a receiving unit 31A, a packet identification unit 31B, a packet filtering unit 31C, and a transmitting unit 31D.

The SoC memory 33 includes a firewall setting unit 33A, a decoding module 33B, and an anti-malware module unit 33C.

The SoC 30 is installed on a main printed circuit board (PCB) of the portable terminal, and interoperates with the MAC unit 10, the I/O interface unit 20, the mobile device application unit 40A constructed on the application memory 40, and the OTA module 50 around the SoC 30. The SoC 30 operates in an autonomous monitoring mode programmed in advance according to normal operation state regulations for I/O data flow, and a mode in which input and output channels are disabled when a current state departs from the requirements of the normal state.

As a part of the data link layer of the basic open systems interconnection (OSI) reference model, the MAC unit 10 is a unique layer of a local area network (LAN) having a characteristic of the same medium being shared by several nodes. Packets received from the outside by communication (wireless communication) are transferred to the SoC 30 through the MAC unit 10.

The packets transferred to the SoC 30 through the MAC unit 10 are stored as they are in the application memory 40 or transferred to the anti-malware engine 32 through the firewall 31. In the application memory 40, an operating system (OS) and various kinds of programs used in a mobile device are loaded.

In the firewall 31, the receiving unit 31A receives packets input through the MAC unit 10 and transfers the packets to the packet identification unit 31B. At this time, the packet identification unit 31B classifies the input packets and outputs the classified packets to the packet filtering unit 31C. The packet filtering unit 31C performs a filtering operation, such as Allow and Drop, on the input packets according to a setting of the firewall setting unit 33A in the SoC memory 33, and then stores the filtered packets in the application memory 40 as they are or transfers the filtered packets to the anti-malware engine 32.

The I/O interface unit 20 includes an I/O chip, card, Bluetooth module, etc., and transfers files to be used by the mobile device application unit 40A to the anti-malware engine 32.

The anti-malware engine 32 performs a malware detection operation on a packet-filtered file output from the packet filtering unit 31C and a file newly input from the I/O interface unit 20. A malware signature database (DB) 42C is constructed on a DB information unit 42 of the mobile device application unit 40A, and the anti-malware engine 32 performs a pattern matching operation between patterns of malicious code registered in the malware signature DB 42C and a code pattern in a file input through the route to detect malicious code.

To perform the pattern matching operation, the anti-malware engine 32 needs to recognize a format (file format, archive format) of the file input from the packet filtering unit 31C and then perform a decoding operation. These functions are supported by the decoding module 33B.

The anti-malware module unit 33C supports an additional function for the SoC 30 to detect malicious code. For example, the additional function may be a function of organizing a malware signature DB when a predetermined period of time elapses, a function of processing in parallel or periodically setting malicious code detection, and so on.

The decoding module 33B and the anti-malware module unit 33C are automatically updated through the OTA module 50 manually or at predetermined periods.

The controller 34 serves to control a switching operation causing the file output from the packet filtering unit 31C to be transferred to the anti-malware engine 32 and a malicious code detection operation to be performed, or causing the file to be output to and stored in the application memory 40 without modification, and serves to control malicious code detection to be performed in a proper cycle or at a proper point in time in consideration of battery power consumption.

Figure 2:
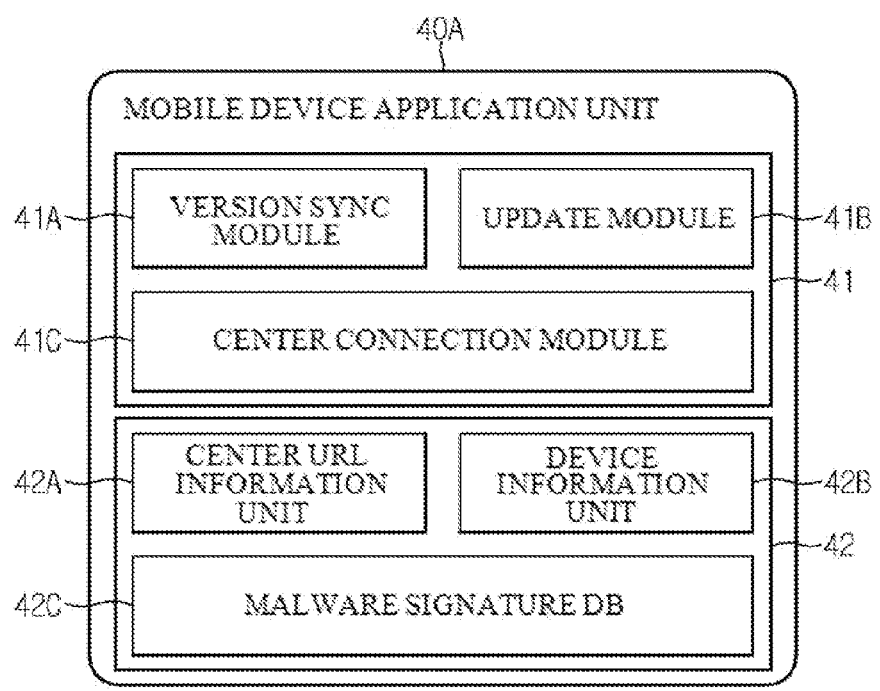
FIG. 2 is a detailed block diagram of a mobile device application unit of FIG. 1.

FIG. 2 shows a constitution of the mobile device application unit 40A interoperating with the SoC 30. As shown in the drawing, the mobile device application unit 40A schematically includes an application module 41 and the DB information unit 42.

The application module 41 includes a version sync module 41A, an update module 41B, and a center connection module 41C, and the DB information unit 42 includes a center uniform resource locator (URL) information unit 42A, a device information unit 42B, and the malware signature DB 42C.

The version sync module 41A compares a vaccine version of a server with that of the portable terminal at predetermined periods, and operates the update module 41B to update a vaccine of the portable terminal with the latest version of the server when the vaccine versions of the server and the portable terminal differ. Also, even when a malware signature DB of the server needs to be updated, the version sync module 41A operates the update module 41B to update the vaccine version of the portable terminal.

In this way, the vaccine version needs to be frequently updated on the basis of continuously occurring vulnerabilities, so that a security policy is kept effective.

Even when the malware signature DB of the server needs to be updated, the version sync module 41A operates the update module 41B to update the vaccine of the portable terminal with the latest version.

When several connection methods are given to a user, the center connection module 41C prioritizes the connection methods and selects a connection method according to a network used by the server. For example, when wireless fidelity (WiFi) can be used, the center connection module 41C enables access to a center URL by use of WiFi instead of selecting a mobile communication company. At this time, the center URL information unit 42A is used to connect the portable terminal with the network of the server through the MAC unit 10 using the selected connection method, for example, a wireless LAN (e.g., WiFi) or a mobile communication company.

The device information unit 42B serves to maintain pieces of information required by the corresponding device.

In an exemplary embodiment of the present invention, ASIC-based hardware is configured on an SoC to detect malicious code introduced into a portable terminal, thereby improving virus scanning and matching performance. Thus, it is possible to perform a virus vaccine service while performing another operation on a mobile device.

Also, since all packets can be monitored through a firewall configured as hardware, a mobile device can be maintained in a safe state from a mobile virus.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

SEQUENCE LIST FREE TEXT mobile device, anti-malware, system-on-chip (SoC), firewall, anti-malware engine

What is claimed is:

1. A system-on-chip (SoC) and application-specific integrated circuit (ASIC)-based apparatus for detecting malicious code in a portable terminal, comprising an SoC,
wherein the SoC includes:
a hardware-based firewall configured to perform a packet-filtering operation on a packet received from the outside through a media access control (MAC) unit according to a setting of a firewall setting unit in an SoC memory, and then store the filtered packet in an application memory or transfer the filtered packet to an anti-malware engine;
the hardware-based anti-malware engine configured to detect malicious code by performing a pattern-matching operation between a code pattern in a file transferred from the firewall or a file received through an input/output (I/O) interface unit and a pattern of malicious code registered in a malware signature database (DB) of a mobile device application unit;
the SoC memory configured to provide the setting of the firewall and support a file-decoding function for file format recognition of the anti-malware engine; and
a hardware-based controller configured to control a switching operation to transfer the file filtered by the firewall directly to the application memory or to the anti-malware engine, and control a malicious code detection cycle of the anti-malware engine,
wherein the SoC memory includes:
the firewall setting unit configured to store setting value for packet filtering of a packet filtering unit in the firewall;
a decoding module configured to perform a decoding operation for the file format recognition of the ant-malware engine; and
an anti-malware module configured to perform a function of organizing the malware signature DB in the SoC when a predetermined period of time elapses, and a function of processing in parallel or periodically setting malicious code detection, and
wherein the firewall setting unit, the decoding module, and the anti-malware module are updated through an over-the-air (OTA) module when firewall code or code of the anti-malware engine is changed or modified via a network.

2. The SoC and ASIC-based apparatus of claim 1, wherein the SoC is an ASIC.

3. The SoC and ASIC-based apparatus of claim 1, wherein the firewall includes:
a receiving unit configured to receive packets input through the MAC unit and transfer the packets to a packet identification unit;
the packet identification unit configured to classify the input packets and output the classified packets to a packet filtering unit; and
the packet filtering unit configured to perform a filtering operation including an allowing operation and a dropping operation on the input packets according to the setting of the firewall setting unit in the SoC memory.

4. The SoC and ASIC-based apparatus of claim 1, wherein the mobile device application unit is constructed on the application memory.

5. The SoC and ASIC-based apparatus of claim 1, wherein the mobile device application unit includes an application module configured to compare a vaccine version of a server with that of the portable terminal at predetermined periods, and operate an update module to update a vaccine of the portable terminal with the latest version of the server when the vaccine versions of the server and the portable terminal differ.

6. A system-on-chip (SoC) and application-specific integrated circuit (ASCI)-based apparatus for detecting malicious code in a portable terminal, comprising an SoC,
wherein the SoC includes:
a hardware-based firewall configured to perform a packet-filtering operation on a packet received from the outside through a media access control (MAC) unit according to a setting of a firewall setting unit in an SoC memory, and then store the filtered packet in an application memory or transfer the filtered packet to an anti-malware engine;
the hardware-based anti-malware engine configured to detect malicious code by performing a pattern-matching operation between a code pattern in a file transferred from the firewall or a file received through an input/output (I/0) interface unit and a pattern of malicious code registered in a malware signature database (DB) of a mobile device application unit;
the SoC memory configured to provide the setting of the firewall and support a file-decoding function for file format recognition of the anti-malware engine; and
a hardware-based controller configured to control a switching operation to transfer the file filtered by the firewall directly to the application memory or to the anti-malware engine, and control a malicious code detection cycle of the anti-malware engine, wherein the mobile application unit includes an application module configured to compare a vaccine version of a server with that of the portable terminal predetermined periods, and operate an update module to update a vaccine of the portable terminal with the latest version of the server when the vaccine versions of the server and the portable terminal differs, and wherein the application module includes a center connection module configured to, when several connection methods are given to a user, prioritize the connection methods and select a connection method according to a network used by the server.

7. The SoC and ASIC-based apparatus of claim 6, wherein the mobile device application unit includes a DB information unit including:

a center uniform resource locator (URL) information unit configured to connect the portable terminal with the network of the server through the MAC unit using the selected connection method;

a device information unit configured to maintain pieces of information required by the corresponding device; and the malware signature DB configured to store and manage a pattern of malicious code for malicious code detection.

8. The SoC and ASIC-based apparatus of claim 1, wherein the SoC is installed on a main printed circuit board (PCB) of the portable terminal.

* * * * *